(12) United States Patent
Bek (10) Patent No.: US 8,109,376 B2
(45) Date of Patent: Feb. 7, 2012

(54) DEVICE FOR OPERATING A SHIFTING ELEMENT OF A DRIVE MECHANISM

(75) Inventor: Manfred Bek, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 930 days.

(21) Appl. No.: 12/125,314

(22) Filed: May 22, 2008

(65) Prior Publication Data

US 2008/0293543 A1 Nov. 27, 2008

(30) Foreign Application Priority Data

May 23, 2007 (DE) .......................... 10 2007 023 955

(51) Int. Cl.
*F16D 25/12* (2006.01)
(52) U.S. Cl. .............. 192/70.22; 192/85.39; 192/109 R; 192/114 R; 92/13.4
(58) Field of Classification Search .............. 192/109 R, 192/85.39, 70.22, 114 R; 92/13.4, 13.1, 92/13.6
See application file for complete search history.

(56) References Cited

U.S. PATENT DOCUMENTS

| | | | | |
|---|---|---|---|---|
| 2,932,282 A * | 4/1960 | McKinley et al. | ................. | 91/45 |
| 3,251,278 A * | 5/1966 | Royster | ............................ | 92/18 |
| 3,548,981 A * | 12/1970 | Hill et al. | ...................... | 192/3.57 |
| 4,081,065 A * | 3/1978 | Smyth et al. | ................... | 477/176 |
| 4,671,394 A * | 6/1987 | Braun | .......................... | 192/3.57 |
| 5,048,656 A | 9/1991 | Braun | | |
| 5,056,632 A * | 10/1991 | Lemp et al. | ................... | 192/3.63 |
| 5,678,671 A * | 10/1997 | Leimbach et al. | .......... | 192/70.22 |
| 6,702,081 B2 * | 3/2004 | Gorman et al. | .............. | 192/52.2 |
| 7,137,495 B2 * | 11/2006 | Berger et al. | ................. | 192/3.58 |
| 7,891,261 B2 * | 2/2011 | Neelakantan | ................... | 74/335 |

FOREIGN PATENT DOCUMENTS

| DE | 31 18 565 A1 | 11/1982 |
|---|---|---|
| DE | 102 05 411 A1 | 8/2003 |

* cited by examiner

*Primary Examiner* — David D Le
*Assistant Examiner* — Terry Chau
(74) *Attorney, Agent, or Firm* — Davis & Bujold, P.L.L.C.

(57) ABSTRACT

A device for operating a shifting element of a drive mechanism, having a piston positioned in a piston space to slide between first and second end positions. The piston is operated hydraulically and depends on the hydraulic pressure in the piston space and a force of a resetting mechanism acting on the piston, which opposes the activating force that is equivalent to the hydraulic pressure in the piston space. The transmission capacity of the shifting element is reduced by a force acting on the piston in the direction of the first end position and is increased by a force acting on the piston in the direction of its second end position. The piston is held by a mechanical holder against a force acting on the piston in the direction of the first end position in at least one preset position which is different from the first end position.

13 Claims, 5 Drawing Sheets

DEVICE FOR OPERATING A SHIFTING ELEMENT OF A DRIVE MECHANISM

This application claims priority from German Application Serial No. 10 2007 023 955.8 filed May 23, 2007.

FIELD OF THE INVENTION

The invention pertains to a device for operating a shifting element of a drive mechanism.

BACKGROUND OF THE INVENTION

In order to reduce fuel consumption, as well as pollutant emissions of vehicles equipped with combustion engines and known from experience, the combustion engine for different vehicle concepts is shut off during certain operating states. These functions are also known as motor start/stop functions, which are activated or de-activated, depending on the operating state of various vehicle components, and cause the combustion engine to be shut off if the vehicle is standing still even for short periods.

In order to avoid impairment of a conventional drive operation by a motor start/stop function, a short starting procedure of the combustion engine and immediate traction buildup are needed within the drive mechanism when the driver causes the vehicle to continue, particularly when entering heavily traveled streets with the right of way. In conventional automatic transmissions or automated gearboxes, which are built with shifting elements that are designed with a wet multiple, disk clutch or brake, the shifting elements are mainly supplied with the necessary control pressure, via a transmission pump, only when the combustion engine is running.

The hydraulically operated shifting elements usually feature at least one piston element, such that one multi-plate assembly of a shifting element is more or less strongly pressed, depending on a hydraulic traction pressure, and via which a preferably operationally-dependent, demanded transmission capacity of a shifting element can be set. The piston elements of the shifting elements are always tensioned against an operating pressure inside the piston space in the direction of a shifting element by way of a spring device, whereby the piston elements are mainly acted on by the total force components that are the result of the operating pressures, as well as the spring devices that move the piston elements toward the opening of the shifting element, or a first end position of the piston elements, or in the locking direction of the shifting elements, or a second end position of the piston elements, and also maintain the preset shifting positions between the two end positions.

If the operating pressure in the piston spaces of the shifting elements of a drive mechanism drops when the combustion engine is shut off, due to the subsequent lacking of supply from the main transmission pump, the piston elements will be moved by the individually associated spring devices to their first end position, whereby the hydraulic fluid volume present inside the piston spaces, is basically fully forced out over time.

When the combustion engine is again operated and traction is built up in the transmission, the piston elements of the shifting element that must be activated must be moved in the direction of their second end position and the multi-plate assemblies must be activated with the operating forces corresponding to the traction forces that are present within the drive mechanism. For this an air gap of the shifting elements to be engaged must, first, be overcome and the shifting elements to be engaged must then be completely engaged by increasing the control pressure according to the preset shifting characteristics. The compensation of the air gap of the shifting elements, as well as their inclusion in the power flow of a drive mechanism, is achieved by supplying a certain hydraulic fluid volume to a piston space of a hydraulically controlled, shifting element that must be engaged, which must be supplied by the transmission pump that is driven by the started combustion engine.

Before the vehicle startup, when the combustion engine has been switched off, if several shifting elements of a transmission have been disengaged by the above spring devices and have to be engaged before the vehicle moves on, the time between the start of the combustion engine starting procedure and the time when traction is fully restored within the transmission may possibly be extended such that a vehicle equipped with a motor start/stop function cannot be operated to the intended extent within the period that a driver would desire or expect, since the possibly fully depleted shifting elements must be supplied by the main transmission pump that is driven by the combustion engine with a substantial hydraulic fluid volume until the traction in the drive mechanism is restored.

In order that vehicles with conventionally designed transmission mechanisms with implemented motor start/stop function can be operated in the desired way and manner within the time desired or expected by a driver, known vehicles have, in addition to the main transmission pump, another hydraulic pump that is preferably operated by an electric motor whose supply volume is independent of the rotational speed of the combustion engine and, when the pressure supply is not available from the main transmission pump in the hydraulic system of the transmission mechanism, it generates at least a pressure which is used to prevent a spring-generated depletion of the shifting elements that must be engaged to generate the traction within the transmission.

Disadvantageously, the above design of a drive mechanism with a main transmission pump driven by a combustion engine and an auxiliary pump driven by an electric motor, when compared to a drive mechanism designed without an auxiliary pump, leads to a reduction in the efficiency of the transmission, as well as to an increase in the manufacturing costs of the gear mechanism. The electrical power requirement of the active auxiliary pump also creates an undesirable demand on the on-board, power circuit. Also, the positioning of the auxiliary pump, preferably located outside of the housing of the drive mechanism, undesirably increases the installation space requirement within the vehicle, as well as the installation expense owing to the hydraulic connection of the auxiliary pump to the hydraulic system of the drive mechanism and the electrical connection of the auxiliary pump to the electrical control and regulation system of the vehicular drive train.

The alternative to this solution using pressure reservoirs are known from experience, which are used to store pressurized hydraulic fluid and then supply this fluid, as needed, to the hydraulic system of a drive mechanism to control the clutches that are to be engaged.

However, such pressure reservoir solutions have the disadvantage that a significant expense is required to store hydraulic fluid at the desired pressure within the reservoir. Main pump filling of the pressure reservoir also increases the pump input momentum of the main transmission pump to an undesirable extent, which likewise negatively affects the overall efficiency of a drive mechanism.

It is, therefore, the object of the present invention to provide a device for operating a shifting element of a drive mechanism, such that traction can be made available in a drive mechanism within shorter operating times in comparison with the drive mechanisms known from experience, simultaneously with good drive mechanism efficiency.

SUMMARY OF THE INVENTION

According to the invention, the device for operating a shifting element of a drive mechanism is designed with a piston element that is moveably positioned in a piston space between a first and a second end position. The piston element is designed to be operated hydraulically, depending on a hydraulic pressure inside a piston space and the resetting force of a resetting unit acting on the piston element, which opposes the activating force that is equivalent to the hydraulic pressure in the piston space. The transmission capacity of the shifting element is reducible by a total force component that acts in the direction of the first end position of the piston element on the piston element, and can be increased by way of a total force component that acts in the direction of the second end position of the piston element on the piston element.

The piston element can be held in place by way of a mechanical holder at least in one predefined position against a total force component acting in the direction of the first end position of the piston element and acting on the piston element; the position being different from the first end position.

This allows the piston element to be held in the predefined position easily and cost-effectively when the total force component acts on the piston element in the direction of the first end position, and the hydraulic fluid of the piston element inside the piston space is not completely forced out when the pressure supply is disrupted. This advantageously reduces the hydraulic fluid volume which must be supplied to the piston space of a shifting element after the start of the combustion engine in comparison with conventional shifting elements, and shifting elements to be engaged can be filled fast enough by a main transmission pump driven by a combustion engine, without an additional transmission pump or a hydraulic pressure reservoir, i.e., in a time interval desired or expected by a driver, and can be changed over to the operating state necessary for vehicle start-up.

In a cost effective and constructively simple development of the device according to the invention, the piston element is held in place in the at least one predefined position by way of at least one locking element that interacts with a housing that encloses the piston space; the element preferably in a positive or friction-fit connection with the piston element when blocking piston movement.

In an advantageous embodiment of the device according to the invention, the locking element when blocking the piston movement, protrudes at least partially into the piston space and thus blocks the movement of the piston element in the direction of its first end position against the total force component acting in the direction of the first end position on the piston element. The component is generated mainly by the resetting device when the combustion engine is turned off. Alternatively, however, it is also possible for the piston to protrude partially from the piston space and for the locking element with the piston element in this area to be a mechanical linkage that blocks the piston movement.

In another advantageous embodiment of the device according to the present invention, the locking element can be operated hydraulically to save space and/or electro-mechanically with only minor sealing expense.

BRIEF DESCRIPTION OF THE DRAWINGS

The invention will now be described, by way of example, with reference to the accompanying drawings. The same reference numerals are used for the sake of clarity in the description of the different exemplary embodiments for components that are identical in design and function. The drawings show.

DETAILED DESCRIPTION OF THE INVENTION

Figure 1:
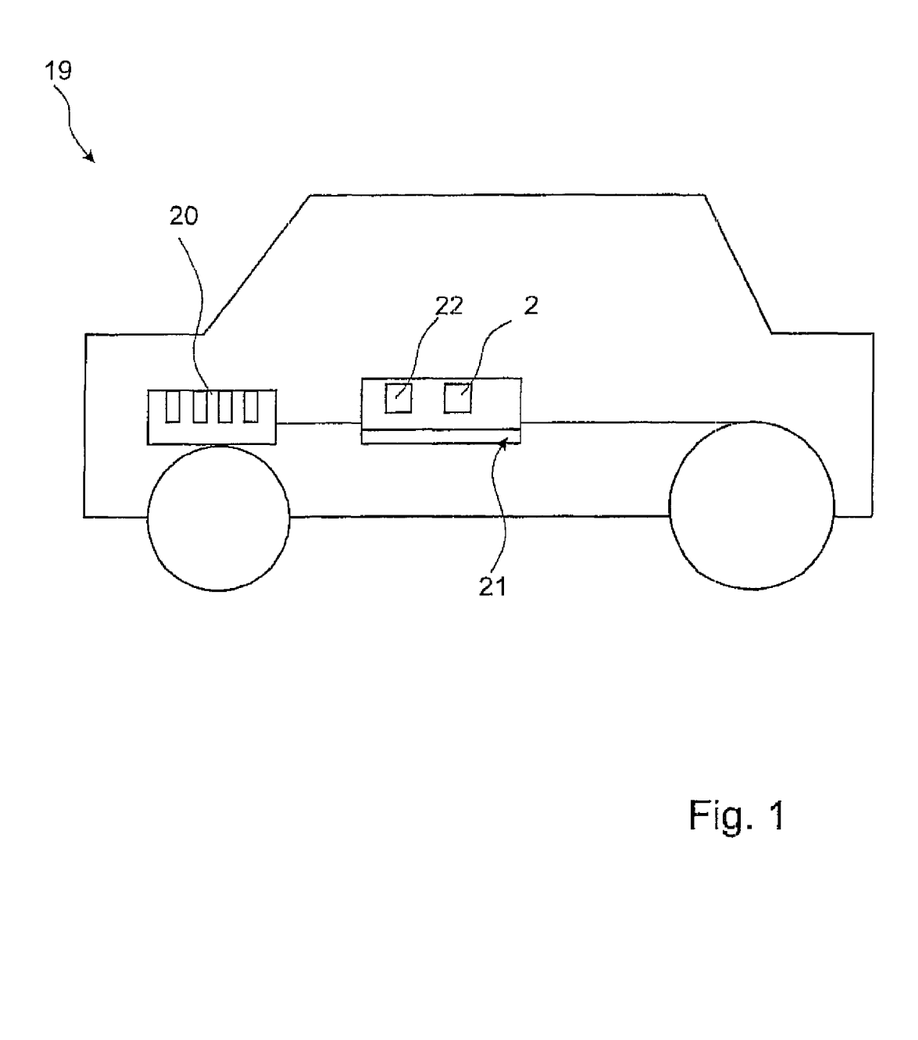
FIG. 1 is a heavily schematic illustration of a vehicle, which is designed with a drive mechanism having a device according to the invention.

FIG. 1 shows a schematic illustration of a vehicle 19 which, in a fashion known per se, is equipped with a combustion engine 20 and a drive mechanism 21. The drive mechanism 21 can basically be comprised of any automated manually, operated transmission or automatic transmission that is known in practice, which is designed with hydraulically controlled shifting elements 2, such as frictional multi-disk clutches or brakes. Here the shifting elements 2 of the drive mechanism 21 are supplied, as needed, with hydraulic fluid by a main transmission pump 22 that is driven by the combustion engine 20 and during the corresponding operation is changed from a disengaged to an engaged state.

In order to optimize consumption, as well as to reduce pollutant emissions of the vehicle 19, a motor start/stop function is provided, such that the combustion engine 20 is shut down during preset operation states of the vehicle 19 and is restarted when one or several preset starting criteria exist, whereby the main transmission pump 22 does not supply hydraulic fluid when the combustion engine 20 is shut off.

Thus the combustion engine 20 is shut off when the brake light is activated and the vehicle is stopped, and/or when the driver activates the clutch pedal even during a very brief stop of the vehicle and the gear selection lever is set to "D" for drive, and again restarted when different starting criteria are present, for example below a brake pressure threshold, when the vehicle brake is released; when the brake light is deactivated; when the driver moves the selector lever into a position that requires the starting of the combustion engine 20; when the accelerator pedal is activated to a degree that is greater or less than a threshold value; when the system initiates a starting procedure of the combustion engine; when the drive speed is greater or less than a threshold value; when a predefined charge balance of an electrical storage device of the vehicle exists or, depending on comfort criteria, such as a request for activating the climate control of the vehicular passenger compartment.

Figure 2:
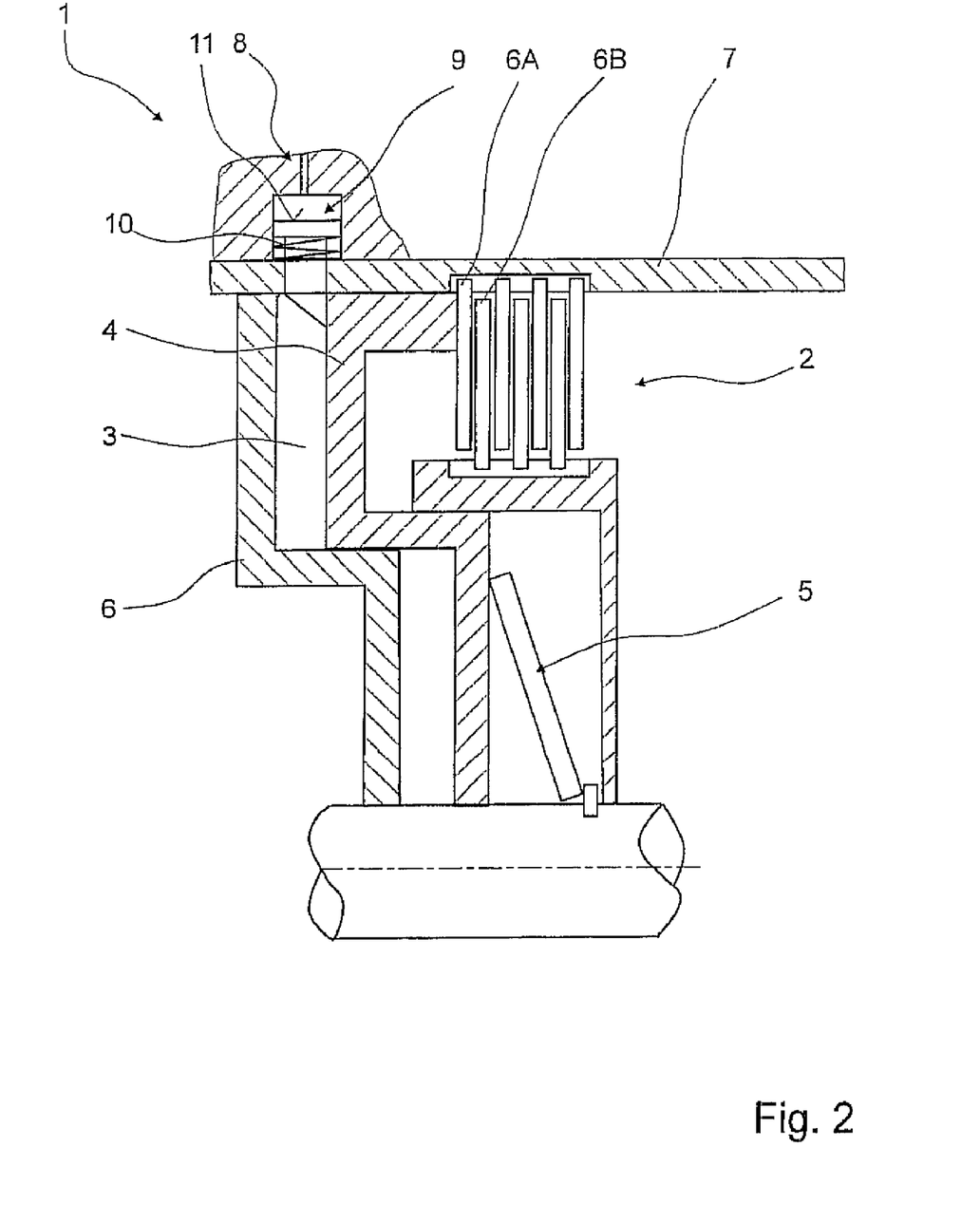
FIG. 2 is a heavily schematic illustration of the first embodiment of the device having a locking element that can be operated hydraulically according to the invention.

FIG. 2 shows a first exemplary embodiment of a device 1 for operating the shifting element 2 that is designed as a multi-disk brake, which is provided to illustrate a starting gear of the drive mechanism 21, with a piston element 4 that is positioned in a displaceable fashion in a piston space 3, between a first and a second end position. The piston element 4 can be hydraulically operated, depending on the hydraulic pressure present in the piston space 3, and the resetting force of a resetting mechanism 5 that acts on the piston element 4, and counteracts the operating force that is equivalent to the hydraulic pressure in the piston space and acts on the piston element, depending on the operating state. The resetting mechanism 5 is designed as a spring mechanism and acts on the piston element 4 with its spring force in the direction of the first end position of the piston element 4.

The transmission capacity of the shifting element 2 can be reduced by a total force component acting in the direction of the first end position of the piston element 4 on the piston element 4. Furthermore, the transmission capacity of the shifting element 2 can be increased by way of a total force component acting in the direction of a second end position of the piston element 4 on the piston element 4. The total force component results from the spring force of the resetting mechanism 5 acting on the piston element 4 and the pressure in the piston space 3 or the pressure force resulting therefrom.

The piston element 4 in its first end position is seated against a housing component 6, which jointly encloses the piston space 3, as well as the piston element 4, whereby the transmission capacity of the shifting element 2 is basically zero and no torque can be applied through the shifting element 2. If the piston element 4 is in its second end position, however, exterior disks 6A and interior disks 6B are engaged in such a manner that the shifting element 2 is fully engaged and a torque applied to the shifting element 2 is fully supported by a housing 7.

If a request is made to open the fully engaged shifting element 2, the pressure inside piston space 3 is reduced accordingly and the piston element 4 is displaced by the resetting mechanism 5 from its second end position in the direction of its first end position, whereby the volume of piston space 3 and the hydraulic fluid volume that is stored therein are steadily reduced. If the piston element 4 reaches its first end position, the hydraulic fluid volume previously stored in the piston space 3 is completely forced out of the piston space 3 and must be completely returned to the shifting element 2 when a subsequent demand is made to engage the shifting element 2.

For example, when the combustion engine 20 of the vehicle 19 is shut off by way of the motor start/stop function, the shifting element 2 moves from an engaged state to an open state, since the main transmission pump 22 that is driven by the combustion engine 20 does not supply the pressure to the piston space 3. This is because the pressure in the piston space 3 immediately drops when the main transmission pump does not supply the pressure and the hydraulic fluid volume that is present in the piston space 3 is gradually forced out by the piston element 4 that is acted upon by the spring force of the resetting mechanism 5.

When the combustion engine 20 is re-activated, which can preferably be done by the activated motor start/stop function, the expelled hydraulic fluid volume must again be returned to the piston space 3 by the main transmission pump 22 in order to generate the traction in the drive mechanism and/or the automatic transmission that is necessary for a starting procedure.

In order to limit the hydraulic fluid volume expelled from the piston space 3 by the resetting mechanism 5 when the combustion engine 20 is shut off, the piston element 4 is held in a preset position by way of a mechanical holder 8 against a total force component acting in the direction of the first end position of the piston element 4 on the piston element 4. The preset position is different from the first end position of the piston element 4.

Starting from a state of the shifting element 2 in which the piston element 4 is completely in its first end position, the amount of hydraulic fluid which must be supplied to the piston space to engage the shifting element 2 after the combustion engine 20 is restarted is significantly lower. Thus in comparison with conventionally designed shifting elements, the shifting element 2 can be moved to its engaged state necessary to generate traction in the drive mechanism within shorter operating periods.

The holder 8 is held in the preset position by a locking element 9 that interacts with the housing 7 that encloses the piston space 3, whereby the locking element 9 is in a state where it blocks the piston movement of the piston element 4, as illustrated in FIG. 2, and at least partly extends into the piston space 3. The locking element 9 is designed as a graduated pin whereby, between the greater part of the diameter and the housing 7, a spring resetting mechanism 10 is provided, which drives the locking element 9 from its piston blocking state in the direction of its piston releasing state. In the region of a front section 11, which faces away from the resetting device 10, the locking device 9 can be changed from a state allowing piston movement of the piston element 4 to a state blocking piston movement, by way of a hydraulic operating pressure which counters the spring force of the resetting device 10.

In the end region, facing the piston element 4, the locking element 9 is beveled in order to ensure that the piston movement of the piston element 4 is not impeded in the direction of its second end position. Further, the locking element 9 and the piston element 4 are in their alternating contact areas designed in such a manner that the locking element 9 remains in the position, illustrated in FIG. 2, even when the front section 11 is being acted on by control pressures, where the spring force of the resetting mechanism 10 is greater than the forces acting on the front section 11. The contact between the locking element 9 and the piston element 4 is characterized by a self-hold, where the locking element 9, even under extremely low operating pressures that can be equal to zero, and against the spring force of the resetting mechanism 5, will remain in the position illustrated in FIG. 2, where the piston element 4 is in its position blocking piston movement.

The self-hold, resulting from the spring force of the resetting mechanism 5, the surface irregularities and/or inclinations of the contact surfaces of the locking element 9 and the piston element 4 that are facing one another is released only when a limit pressure in the piston space 3 is exceeded. A compression force, between the piston element 4 and the locking element 9, is smaller than a predefined value and the self-hold, between the piston element 4 and the locking element 9, is again smaller than the spring force of the spring resetting mechanism 10.

Figure 3:
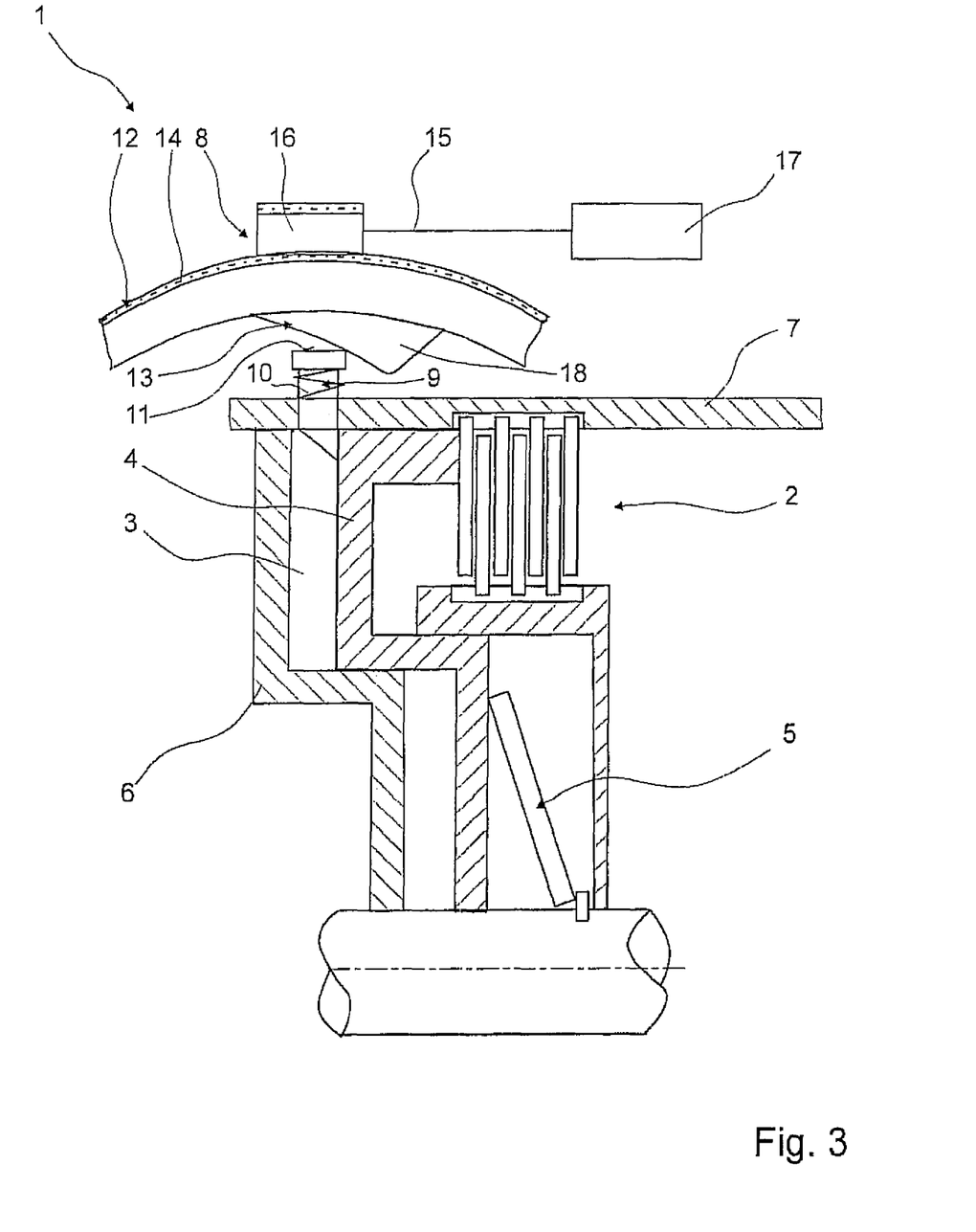
FIG. 3 is an illustration of a second exemplary embodiment of the device corresponding to FIG. 2 having an electro-mechanically operated locking element according to the invention.

FIG. 3 shows a second embodiment of the device 1, where the device 1, according to FIG. 3, varies from the device 1 in FIG. 2 only in the area of the holder 8. For this reason, only those differences are further explained in the following illustration for FIG. 3 and reference is made to the previous description regarding the other functions.

The locking element 9 of device 1, according to FIG. 3, is moved by an actuator 12 from a state releasing the piston movement of the piston element 4 to a state locking the piston movement. The actuator 12 is designed as a locking wheel which, in the area of the interior side that is facing the locking element 9, is designed with a cam unit 13 such that rotation of the actuator 12 about rotational axis causes an axial displacement of the locking element 9 against or in the direction of the spring force of the resetting mechanism 10. For this purpose, the cam unit 13 of the actuator 12 has a sloped plane in the area of a cam follower 18 in relation to the rotational plane of the actuator 12.

On its exterior side, facing away from the locking element 9, the actuator 12 has a worm gearing 14, which meshes with a worm gear 16, that is connected to a motor output shaft 15. The motor output shaft 15 is again rotationally driven by an electric motor 17, whereby the rotation of the motor output shaft 15 generates a rotary movement of the worm gear 16 and also the actuator 12 and thus the actuator 12 is connected to the electric motor 17 via a drive mechanism. As the actuator 12 rotation increases, the cam unit 13 displaces the locking element 9 in the direction of the piston space 3. If the locking element 9 engages the piston space 3 with its end facing away from the actuator 12, piston movement of the piston element 4 in the direction of the first end position of the piston element 4 is blocked.

The actuator 12 is designed with several cam followers 18 of the cam unit 13, which are equally distributed on the interior side of the actuator 12 in a manner not further illustrated, which permit the electric motor 17 to be operated only in one rotational direction since the locking element 9 is periodically controllable with the different cam followers 18 of the actuator 12.

Figure 4:
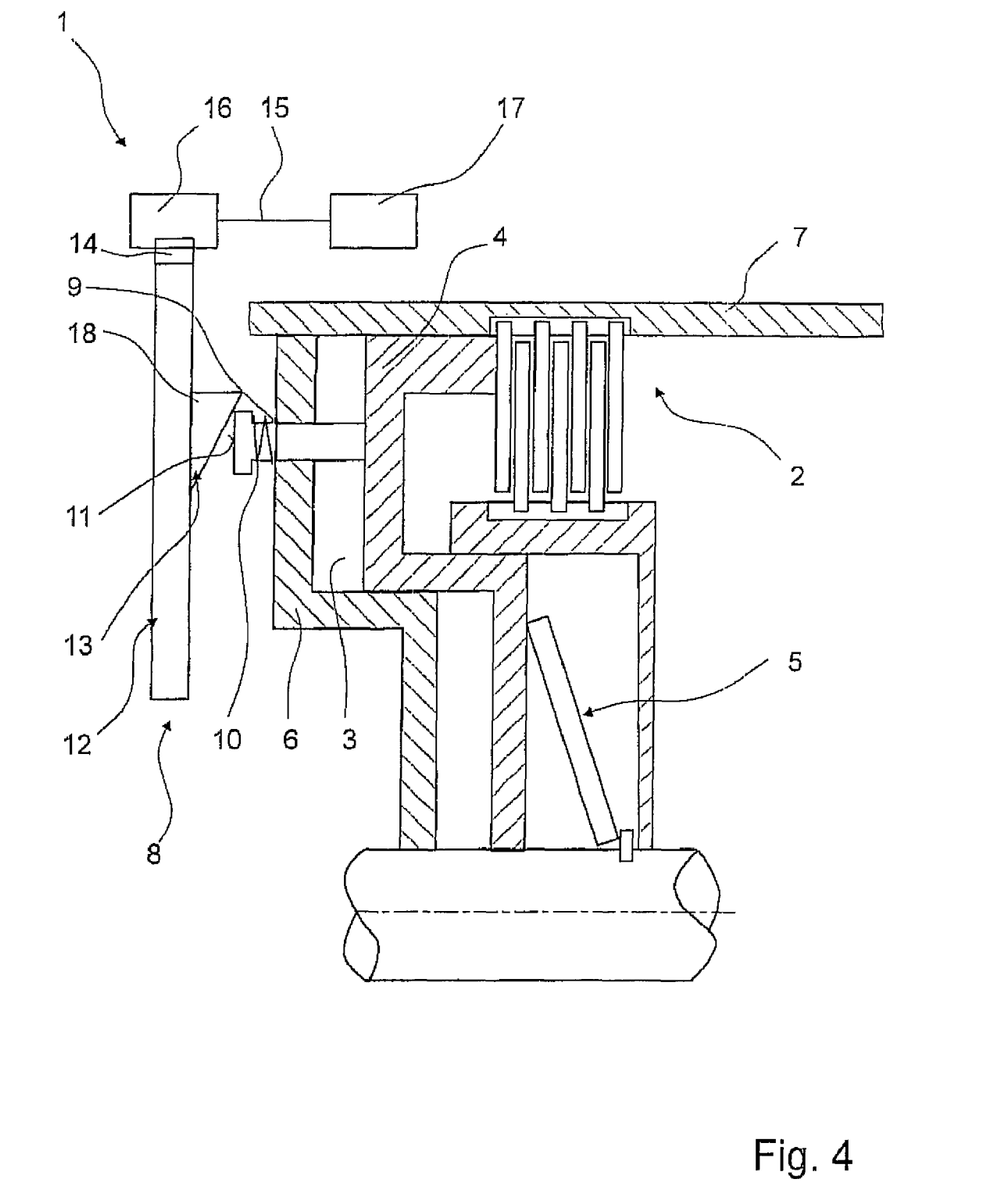
FIG. 4 is an illustration of a third exemplary embodiment of the device corresponding to FIG. 2 having an electro-mechanically operated locking element according to the invention.

FIG. 4 shows a third exemplary embodiment of the device 1, where the locking element 9 is mechanically connected through the housing component 6 to the piston element 4 in the axial direction in order to be able to keep the piston element 4 at a preset position. The embodiment of device 1, according to FIG. 4, basically corresponds to the embodiment of device 1, according to FIG. 3, and differs only in the positioning of the actuator 12 in relation to the shifting element and with respect to the insertion direction of the locking element 9 into the piston space 3. In device 1, illustrated in FIG. 3, the locking element 9 is inserted into the piston space 3 in a radial direction that originates from the outer diameter of the piston space 3.

The gear 16, which is connected to the motor output shaft 15 of the electric motor 17, can be designed for the device 1, according to FIG. 4, with a more cost effective straight gearing in order to transmit the rotation of the electric motor 17 to the actuator 12 to the desired extent, since the rotational movement of the gear 16 cannot be redirected as required for device 1, according to FIG. 3.

Figure 5:
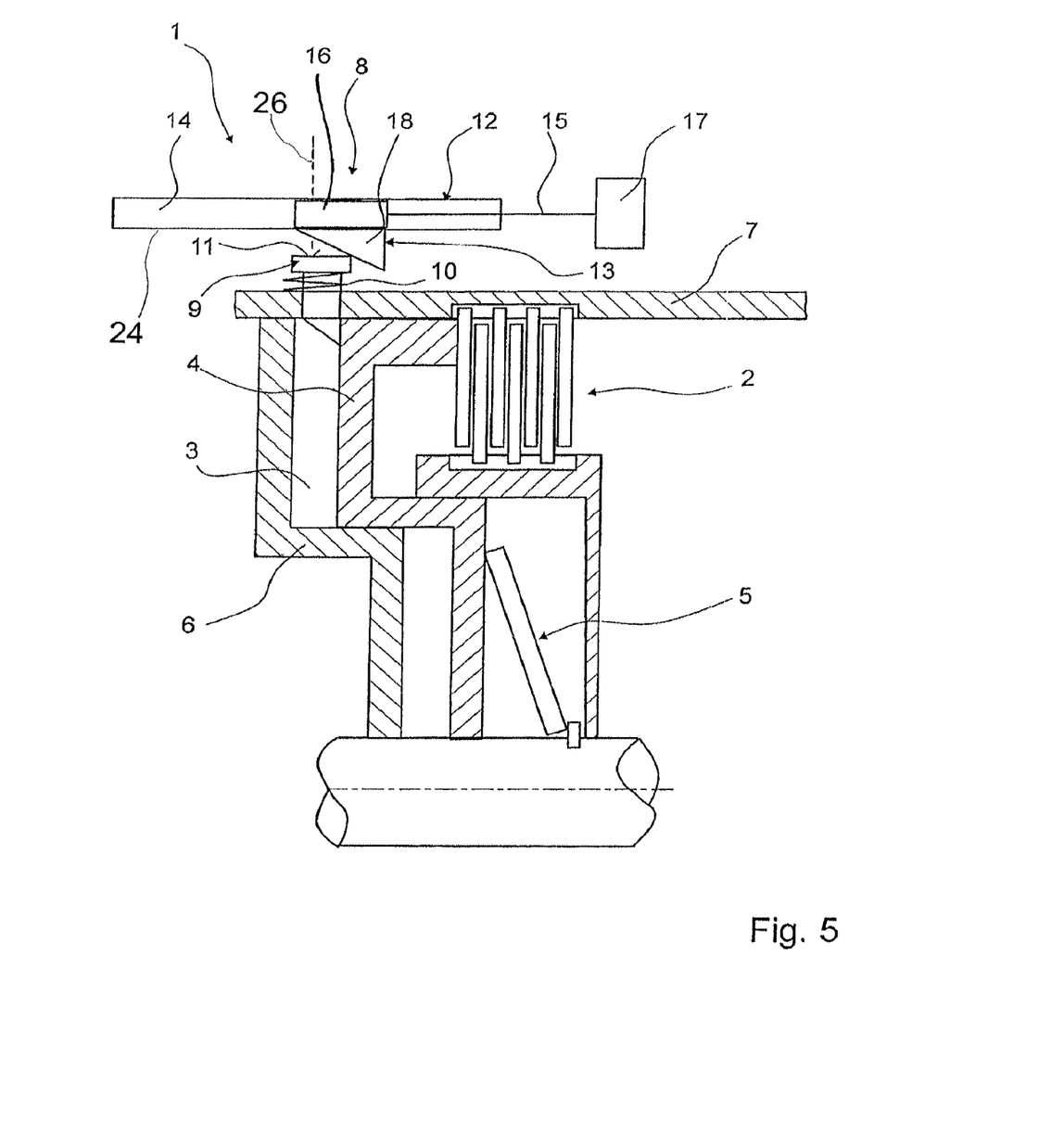
FIG. 5 is a simplified illustration of a fourth exemplary embodiment of the device having an electro-mechanically operated locking element according to the invention.

In a fourth embodiment of the device 1, illustrated in FIG. 5, the locking element 9 is inserted as in the embodiment of device 1, according to FIG. 2 and FIG. 3, radially from the outside into the piston space 3, whereby the operation of the locking element 9 is electro-mechanical, as in the embodiments of the device 1, according to FIG. 3 and FIG. 4. The actuator 12 of the device 1, according to FIG. 5 or its rotational plane 24, is basically positioned parallel to the front side 11 of the locking element 9 and parallel to the axis of symmetry of the shifting element 2 such that the rotational axis 26 of the actuator 12 is normal to its rotational plane 24 and parallel to axial displacement of the locking element 9.

Alternative to the exemplary embodiments of the device for operating a shifting element shown in the illustration, other arrangements of the device are provided such that the piston element protrudes at least partially from the piston space and is attachable outside of the piston space to a locking element of the holder in a positive or friction fit and can be held in place by the holder in a preset position.

Further, alternatively or in combination with one of the previously described exemplary embodiments of the device according to the invention, in further embodiments of the device, it is provided that the locking element of the holder, instead of the spring resetting mechanism, can be moved between the piston blocking state and the piston releasing state by way of a positive drive featuring an actuator. The actuator is equipped with a control groove to which the locking element is actively connected: in such a manner that a movement of the actuator will initiate a movement of the locking element in the direction of its blocking piston movement position or in the direction of its releasing piston movement position.

Depending on the specific application, the shifting element 2 of the drive mechanism 21, when the piston element is held in its preset position, is in an operating state to which at least a portion of the present torque can be supplied via the shifting element 2, or to which the shifting element 2 is completely disengaged. The transmission capacity of the shifting element 2 in the preset position in the exemplary embodiments of the device 1, according to FIGS. 2, 3, and 5, is dependent on the arrangement of the locking element 9 in the housing 7 and cannot be varied. On the other hand, transmission capacity of the shifting element 2 in the arrangement of device 1, according to FIG. 4, depends on how far the locking element 2, which in the area of its end facing the piston element 4 is designed without a flat section, is inserted into the piston space 3 and, therefore, can also be adjusted depending on the amount of the locking element 9 inserted into the piston space 3.

If the pressure drop within the piston space 3 is caused by a system defect and the defective vehicle must be towed to a repair shop, the effective position of the locking element 9 need not be released by way of an appropriate release mechanism prior to the towing procedure if the transmission capacity of the shifting element 2 is basically zero when the piston element 4 is positioned in its preset position. On the other hand, the generation of traction in the drive mechanism requires that a greater hydraulic fluid volume be supplied to the piston space 3 of the shifting element before the shifting element has the transmission capacity necessary for a starting procedure.

Basically, according to the invention, the device can also be equipped with more than one locking element to hold the piston element of a shifting element designed as a multi-plate brake or clutch. Here the arrangement of several locking elements in a simple manner prevents the tipping of the piston element and precludes in a simple manner the seizing of the piston element with the components that comprise the cylinder.

REFERENCE NUMERALS 1 device
2 shifting element
3 piston space
4 piston element
5 resetting mechanism
6 housing component
6A exterior disks
6B interior disks
7 housing
8 holder
9 locking element
10 spring resetting mechanism
11 front section
12 actuator
13 cam unit
14 worm gearing
15 motor output shaft
16 worm gear
17 electric motor
18 cam follower
19 vehicle 20 combustion engine
21 drive mechanism
22 main transmission pump

The invention claimed is:

1. A device (1) for operating a shifting element 2 of a drive mechanism 21 the device 1 comprising a piston element (4) that is positioned in a piston space (3) in a displaceable arrangement between a first end position and a second end position, and depending upon a hydraulic pressure in the piston space (3) and a resetting force of a resetting mechanism (5), acting on the piston element (4) and opposing an activating force that is equivalent to the hydraulic pressure present in the piston space (3), the piston element (4) being operated hydraulically such that a transmission capacity of the shifting element (2) is reduced by a total force component acting in a direction of the first end position on the piston element (4) and is increased by a total force component acting in a direction of the second end position on the piston element (4), and the piston element (4) being held, by a mechanical holder (8), against the total force component acting in the direction of the first end position on the piston element (4) in at least one preset position which is different from the first end position;
 the piston element (4) being retained in place by at least one locking element (9) that interacts with a housing (7), which encloses the piston space (3), in at least one preset position, and the at least one locking element (9), in a piston-blocking state penetrates the housing (7) to be in active connection with the piston element (4);
 the at least one locking element (9) being biased by an actuator (12) at least from a piston releasing state toward a piston blocking state;
 the actuator (12) having at least one cam unit (13) being in active connection with the locking element (9) such that movement of the actuator (12) in one direction causes movement of the locking element (9);
 during activation of the locking element (9), the cam unit (13) changing a direction of movement of the actuator (12) into a direction of movement of the locking element (9);
 rotational motion of the actuator (12) biasing the locking element (9) along an axis, via the cam (13); and
 the axis along which the locking element (9) is biased, is parallel to an axis about which the actuator (12) rotates.

2. A device (1) for operating a shifting element (2) of a drive mechanism (21), the device (1) comprising a piston element (4) that is positioned in a piston space (3) in a displaceable arrangement between a first end position and a second end position and, depending upon a hydraulic pressure in the piston space (3) and a resetting force of a resetting mechanism (5), acting on the piston element (4) and opposing an activating force that is equivalent to the hydraulic pressure present in the piston space (3), the piston element (4) being operated hydraulically such that a transmission capacity of the shifting element (2) is reduced by a total force component acting in a direction of the first end position on the piston element (4), and is increased by a total force component acting in a direction of the second end position on the piston element (4), and the piston element (4) being held, by a mechanical holder (8), against the total force component acting in the direction of the first end position on the piston element (4) in at least one preset position which is different from the first end position;
 the piston element (4) is held in place by at least one locking element (9) that interacts with a housing (7), which encloses the piston space (3), in at least one preset position, and the at least one locking element (9), in a piston-blocking state penetrates the housing (7) to be in active connection with the piston element (4);
 the at least one locking element (9) is biased by an actuator (12) at least from a piston releasing state to a piston blocking state;
 the actuator (12) has at least one cam unit (13) which is in active connection with the locking element (9) such that movement of the actuator (12) in one direction causes movement of the locking element (9);
 during activation of the locking element (9), the cam unit (13) changes a direction of movement of the actuator (12) into a direction of movement of the locking element (9); and
 the actuator (12) is connected to and driven by an electric motor (17), via a drive shaft (15) and gearing (14, 16).

3. The device according to claim 2, wherein the at least one locking element (9), in the piston-blocking state, blocks movement of the piston element (4) in the direction of the first end position and at least partially protrudes into the piston space (3).

4. The device according to claim 2, wherein the at least one locking element (9) is one of operated hydraulically and electro-mechanically.

5. The device according to claim 2, wherein the at least locking element (9) is changed by the actuator (12) from the piston blocking state to the piston releasing state.

6. The device according to claim 5, wherein the actuator (12) has at least one control groove, which the at least one locking element (9) engages in such a manner that a movement of the actuator causes a movement of the at least one locking element (9).

7. The device according to claim 2, wherein the at least one locking element (9) is changed, by a spring resetting mechanism (10), from a piston blocking state to a piston releasing state.

8. The device according to claim 2, wherein, when the piston element (3) is in the preset position, the transmission capacity of the shifting element (2) is zero.

9. The device according to claim 2, wherein at least part of an applied torque is guided, via the shifting element (2), when the piston element (3) is in the preset position.

10. The device according to claim 2, wherein the shifting element (2) is one of a multi-plate brake and a multi-plate clutch.

11. The device according to claim 2, wherein the direction of movement of the actuator (12) is normal to the direction of movement of the locking element (9).

12. The device according to claim 2, wherein rotational motion of the actuator (12) biases the locking element (9) along an axis, via the cam (13).

13. A device (1) for operating a shifting element (2) of a drive mechanism (21), the device (1) comprising:
 a piston element (4) being axially slidable between a first end position and a second end position;
 a piston chamber (3) being hydraulically pressurized for biasing the piston element (4) toward the second end position and causing engagement of the shifting element (2);
 a reset mechanism (5) mechanically biasing the piston element (4) toward the first end position and causing disengagement of the shifting element (2);
 a locking element (9) penetrates a housing, enclosing the piston chamber (3), for engaging the piston element (4) and retaining the piston element (4) in at least one preset position and preventing the piston element (4) from being biased toward the first end position; and the locking element (9) has a surface that engages a sloped surface of a cam (13), the cam (13) is fixed to a face of a locking wheel (12), an outer perimeter of the locking wheel (12) has gearing (14) which engages a worm gear (16) such that rotation of the worm gear (16) about a first axis, via an electric motor (17) and shaft (15), drives the locking wheel to rotate about a second axis that is normal to first axis, the cam (13) being located on the locking wheel (12) such that the sloped surface of the cam (13) engages and biases the locking element (9) along a third axis which is parallel to the second axis and normal to the first axis.

* * * * *